United States Patent [19]
Goodsmith et al.

[11] 3,961,408
[45] June 8, 1976

[54] FASTENER INSTALLATION HEAD

[75] Inventors: Dale H. Goodsmith; Harold A. Ladouceur, both of Livonia, Mich.

[73] Assignee: Multifastener Corporation, Detroit, Mich.

[22] Filed: May 5, 1975

[21] Appl. No.: 574,775

[52] U.S. Cl. ............................. 29/208 C; 29/208 D; 29/211 D; 227/2
[51] Int. Cl.² ........................................ B23P 19/04
[58] Field of Search ............ 29/208 C, 432.2, 211 D, 29/432, 208 E, 509, 211 R, 200 B, 208 R, 208 D, 432.1; 227/86, 2, 149, 61, 116

[56] References Cited
UNITED STATES PATENTS

| | | | |
|---|---|---|---|
| 2,187,647 | 1/1940 | Double et al. ............... | 29/208 R X |
| 3,089,360 | 5/1963 | Steward ........................ | 227/116 X |
| 3,098,576 | 7/1963 | Steward ........................ | 227/2 |
| 3,405,436 | 10/1968 | Koett ............................. | 29/211 D X |
| 3,718,965 | 3/1973 | Steward ........................ | 29/211 D |
| 3,810,290 | 5/1974 | Grube ........................... | 29/211 D X |
| 3,811,171 | 5/1974 | Grube ........................... | 29/208 D |

*Primary Examiner*—Victor A. DiPalma
*Attorney, Agent, or Firm*—Cullen, Settle, Sloman & Cantor

[57] ABSTRACT

A fastener installation head having a reciprocating plunger receiving fasteners through a transverse fastener passage from a feed means and a fastener sensor means located within the fastener passage sensing the presence or absence of fasteners in the fastener passage ready for installation. The fastener sensor means includes an electrical switch which may be interconnected to the plunger activation circuit, opening the circuit and stopping the plunger when a fastener is not ready for installation.

10 Claims, 10 Drawing Figures

FASTENER INSTALLATION HEAD

FIELD OF THE INVENTION

This invention relates to fastener installation heads having a reciprocating plunger and more particularly to installation heads for self-attaching nut systems, such as pierce and clinch nuts.

DESCRIPTION OF THE PRIOR ART

Installation heads for pierce and clinch nuts generally include a passage receiving the nuts, a transverse plunger passage having a reciprocating plunger and a feed means feeding nuts from the nut passage beneath the plunger for installation by the head. Present installation heads are generally designed to accomodate only one type of self-attaching nut system, either in bulk or strip form. Positive feed installation heads, wherein the nut is fed into the plunger passage by a reciprocating pawl, are generally limited to nuts systems in a strip form. The strip is inserted into the plunger passage and the plunger shears the end nut from the strip. Certain problems have developed in the present positive feed systems. A reliable stop system must be provided to prevent feeding of the nut strip prior to actuation of the plunger, particularly where the strip is first inserted into the head to avoid jamming or breakage of the feed system. Further, the nut must be accurately located beneath the plunger to avoid partial feeding or jamming of the head. Finally, the present self-attaching nut installation heads are not capable of feeding and installing nuts both in bulk and strip form.

A pierce nut, which may be installed by the disclosed embodiments of the fastener installation head disclosed herein, is shown in the U.S. Pat. No. 3,152,628 of Strain et al, assigned to the assignee of the instant application. Pierce nuts are generally rectangular fasteners having a flanged end portion and an opposed piercing pilot portion which pierces its own hole in a panel or the like and is secured within the panel opening. Alternatively, a clinch nut is normally disposed into a pre-pierced panel opening and the nut is deformed to retain the nut in the panel opening. A suitable clinch nut, which may be installed by the fastener installation head of this invention, is shown by the U.S. Pat. No. 2,750,660, of Newcomb, assigned to the assignee of the instant application. Pierce and clinch nut systems have also been developed, wherein the nut pierces the panel opening and the nut is then clinched to retain the nut in the panel opening.

More recently, pierce and clinch nuts have been developed in a strip form, wherein the nut strip is disposed in the nut passage and the plunger shears the end nut from the strip for installation in a panel, or the like, located below the plunger passage. The feed mechanism advances the nut strip to feed an individual nut beneath the plunger for shearing and installation by the plunger. A pierce nut strip system is shown in the U.S. Pat. No. 3,711,931, of Ladouceur et al, which patent is also assigned to the assignee of the instant application. Integral pierce and clinch nut strips are also available, wherein the nuts are formed in a continuous strip interconnected by flangeable sections of the strip.

A pierce nut installation head particularly adapted to feed and install pierce nuts in bulk form is shown in the U.S. Pat. No. 3,089,360, of Steward, assigned to the assignee of the instant application. A further U.S. Pat. No. 3,108,368, of Steward, discloses the method of installing in sizing a pierce nut in a panel. The feed system in the patents of Steward may be referred to as an impositive feed, wherein the pierce nuts are resiliently urged into location for installation. An impositive feed pierce nut head for integral strip nuts is disclosed in U.S. Pat. No. 3,810,290 and a positive feed for an integral pierce nut strip is shown in U.S. Pat. No. 3,811,171.

It is the primary object of the present invention to provide a fastener installation head which will accomodate pierce or clinch nuts in bulk or strip form, which is more reliable than the installation heads presently available, overcoming the disadvantages of the present installation heads and which may utilize a positive nut feed system.

SUMMARY OF THE INVENTION

As described, the fastener installation head of this invention is particularly adapted to feed and install pierce and clinch nuts of the type described. This type of fastener installation head normally includes a first or nut passage receiving nuts for installation by the head, a transverse plunger passage communicating with the nut passage and a plunger reciprocating in the plunger passage from a position above the intersection of the passages and through the passage intersection to install a nut received beneath the plunger. A positive or impositive feed mechanism is normally provided to feed a nut from the nut passage to the plunger passage, beneath the plunger, upon actuation of the plunger. Where the pierce or clinch nuts are in bulk form, an impositive feed system has been utilized. Positive and impositive feed systems have been used for pierce and clinch nuts in strip form. One particular problem with the feeding of pierce or clinch nuts in strip form has been accomodating the normal tolerances of the strip, including the spacing between the nuts, the nut tolerances, etc. The dimentional variations in the nut strips may accumulate, causing the feeding of partial nuts, etc., resulting in breakage or jamming of the nut installation head. The nut installation of this invention is particularly adapted to accomodate the dimentional variations in the nut strips, providing reliable feeding and installation of pierce and clinch nuts in either bulk or strip form.

As described in the above referenced prior art patents, a pierce or clinch nut installation head may be located in a metal forming die, wherein the nuts are secured to the formed metal panel, or the like, simultaneously with the forming of the panel. It is therefore particularly important to assure that a nut will be fed into the plunger passage and installed upon each stroke of the plunger, which occurs upon the closing of the die faces. The preferred embodiment of the fastener installation head of this invention then includes a sensor means adapted to indicate the presence or absence of a nut ready for installation. As described, the nuts sensor means may also be interconnected to the plunger actuation circuit, which is normally the electrical circuit for closing of the dies.

In view of the commercial use of a pierce or clinch nut installation head in the die operation, it is also important to locate the sensor means within the fastener installation head housing, preventing contamination of the sensor and assuring reliable operation. Further, it is advantageous to sense the presence or absence of a nut ready for installation, rather than a nut being installed or the presence of more than one nut in the installation head. This operation will assure that the last nut is installed and that the plunger will not be actuated when a nut is not ready for installation.

The nut sensor means of the present invention is located within the nut passage and includes a probe means sensing the presence or absence of the nut adjacent the plunger passage and thereby ready for installation. The disclosed sensor means includes an electrical switch inteconnected with the actuation circuit of the plunger. The probe means normally closes the plunger actuation circuit when a nut is located within the nut passage adjacent the plunger passage and thereby ready for installation. The sensor means may also be utilized to prevent actuation of the plunger circuit when a nut is not located in the ready position.

In the disclosed embodiment, the probe means includes an arm extending generally parallel to the nut passage, sensing the location of the nut ready for installation. In one embodiment of the nut sensor means utilized in the fastener installation head of this invention, the sensor arm includes a channel-shaped end portion opening toward and engaging a fastener located within the fastener passage, adjacent the plunger passage. The sensor arm is pivotally connected to the housing and biased by a fastener located in the ready position, closing the sensor switch. The fastener installation head includes a pawl arm reciprocating within the fastener or nut passage, feeding nuts into the plunger passage. In this embodiment, the pawl arm reciprocates within the channel-shaped sensor arm to feed fasteners beneath the plunger. In the second embodiment, the sensor arm is biased against the pawl arm, sensing the location of a nut in the ready position. In either embodiment, sensor means indicates to indicate the presence of a nut located within the nut passage, adjacent the plunger passage and ready for installation. Further, the sensor switch may be interconnected with the plunger activation circuit, preventing activation of the plunger, except when a nut is ready for installation.

Other advantages and meritorous features of the fastener installation head of this invention will be more fully understood from the following description of the drawings and preferred embodiments, the drawings and the appended claims.

DESCRIPTION OF THE PREFERRED EMBODIMENTS

Figure 1:
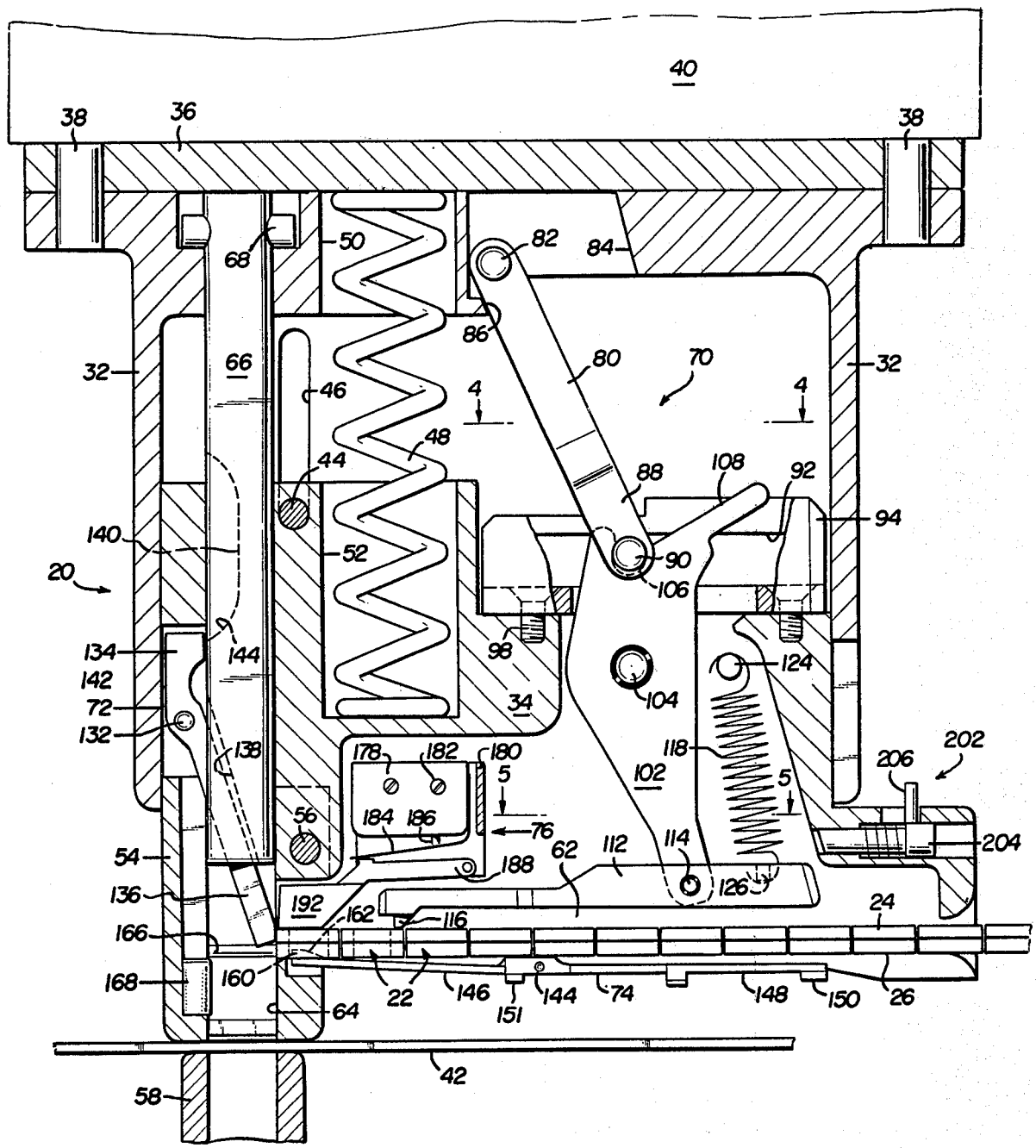
FIG. 1 is a side, partially cross-sectional view of one embodiment of the fastener installation head of this invention, ready for installation of a fastener.

As described above, the fastener installation head in this invention is particularly adapted to feed and install pierce and clinch nut either in bulk or strip form. The fastener installation head 20 shown in FIGS. 1–5 is feeding and installing a plurality of conventional pierce nuts 22. The disclosed pierce nuts are generally rectangular, including a flanged end 24, a piercing pilot portion 26 and a groove 28 for receiving and securing the panel after piercing. A more detailed disclosure of pierce nuts may be found in the above referenced U.S. Pat. No. 3,152,628, of Strain et al. Further, as described, the fastener installation head of this invention may be utilized to secure pierce or clinch nuts, such as disclosed in the above referenced U.S. Pat. No. 3,711,931 of Ladouceur, et al, The disclosed embodiment of the fastener installation head includes two telescopic housing components, including a stationary housing component 32 and a relatively moving housing component 34. As described above, a pierce or clinch nut installation head may be utilized in combination with a conventional forming die, wherein a panel is simultaneously formed and the pierce or clinch nuts installed in the panel. The disclosed embodiment then includes a connector plate 36 which is secured to the stationary housing component 32 by suitable bolts 38, or the like. Reference character 40 may be one section of a die, wherein the fastener installation is secured within a die member or 40 may be a conventional ram reciprocating toward and away from the panel or other structural member 42 which is to receive the fasteners 22.

In the disclosed embodiment, the telescopic housing components are retained by a pin or bolt 44 disposed through the relatively movable housing component 34 and received in a slot 46 defined in the stationary housing component 32, permitting relative movement between the housing components. The housing components are normally maintained in the extended position shown in FIG. 1 by coil spring 48; one end being received in a pocket 50 in the stationary housing component 32 and the opposed end received in a pocket or chamber 52 in the relatively movable housing component 34. It will be understood that the type of spring or extension means will depend upon the particular application, including the distance between the housing components and the strnegth of the spring required to extend the housing components as shown in FIG. 1. The disclosed embodiment of the fastener installation head also includes a separate nose 54 which is secured to the movable housing component 34 by a suitable bolt or pin 56.

The panel 42, which is to receive the fastener installed by the fastener installation head 20, is shown supported against the nose 54 by a die member 58. The die member 58 supports the panel 42 during installation of the fastener and receives the pierced panel slug, as will be described hereinbelow.

The disclosed embodiment of the nut installation head includes a nut passage 62 receiving a plurality of nuts 22 for installation by the head, a transverse plunger passage 64 communicating with the nut passage and a plunger 66 reciprocating relative to the movable housing component 34 in the plunger passage 64. The plunger is retained in the stationary housing component in the disclosed embodiment by a transverse pin 68. The nuts 22 received in the nut passage 62 are fed into plunger passage 64, beneath plunger 66, by feed mechanism 70. A stop lever 72 is provided to prevent nuts from entering the plunger passage 64 except upon downward actuation of the plunger 66. The disclosed embodiment of the fastener installation head also includes a restrictor arm 74 which presents nuts located in the nut passage 62, adjacent the plunger passage 64, from withdrawing into the nut passage. The disclosed embodiment also includes a nut sensor 76 which is adapted to sense the location of a nut adjacent the plunger passage and thereby ready for installation. The construction and operation of the fastener installation elements will be described hereinbelow.

Figure 3:
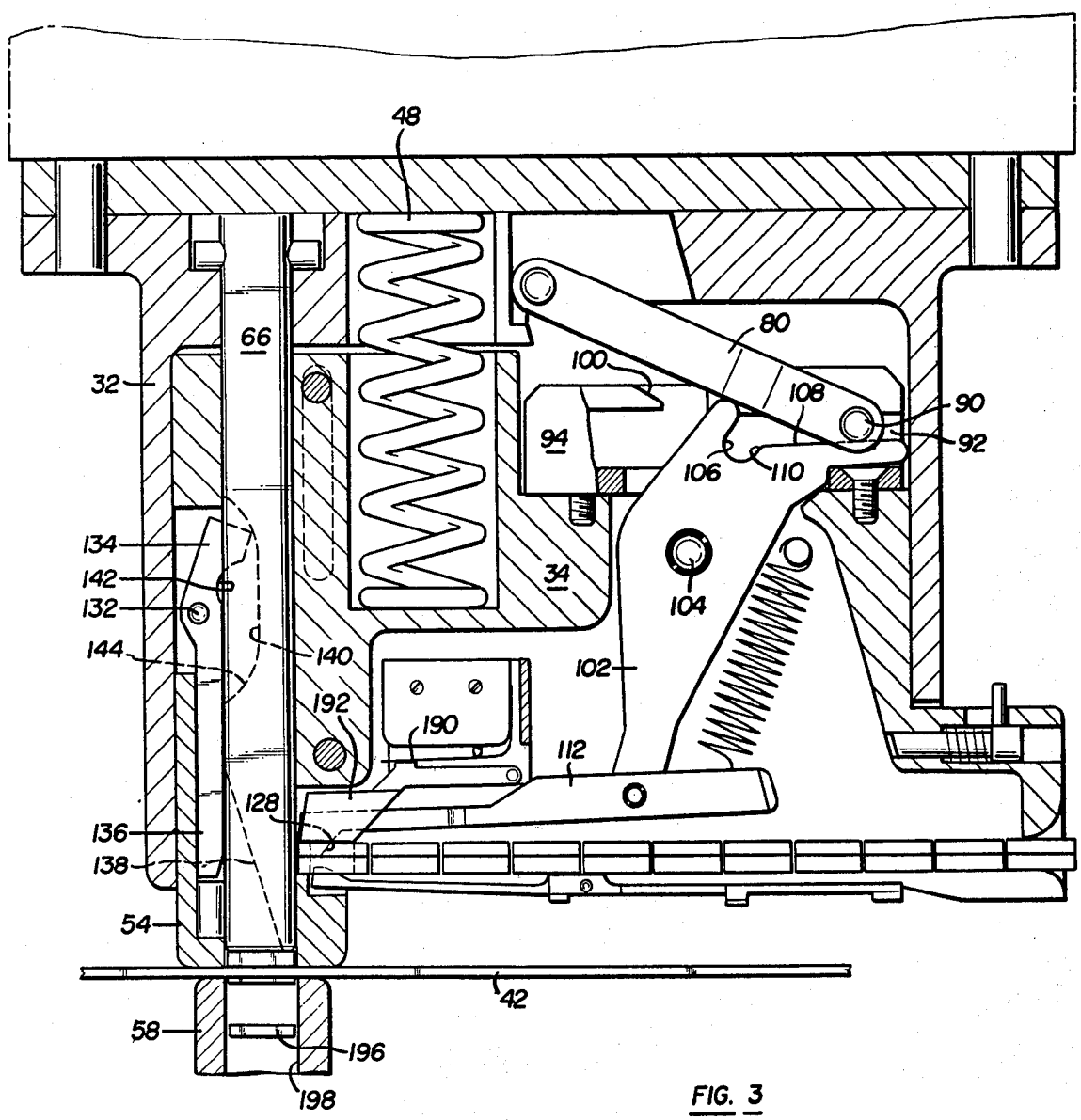
FIG. 3 is a side partially cross-sectional view of the fastener installation head shown in FIG. 1, following installation of a fastener.
Figure 4:
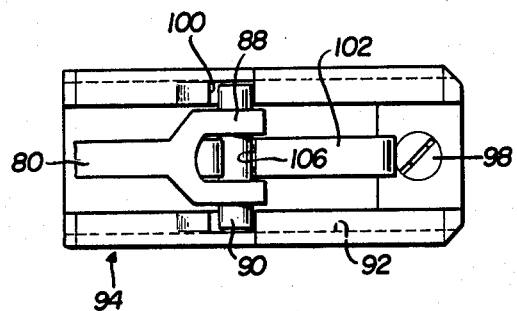
FIG. 4 is a top cross-sectional view of FIG. 1, in the direction of view arrows 4—4.

The feed mechanism of the disclosed embodiment includes a drive link 80, a transverse guide member 94, a driven or feed link 102 and a pawl arm 112. The drive link 80 is pivotally connected to the stationary housing component 32 by pin 82. A slot 84 is provided in the upper portion of the stationary housing component to permit the drive link to pivot about pin 82 and a stop 86 is provided to prevent the drive link from rotating clockwise beyond the position shown in FIG. 1. The free end of the drive link is bifurcated as shown in FIG. 4 to receive a guide pin 90. The guide pin is received in a guide slot 92 in guide member 94 as shown in FIG. 1. The guide member thus translates the normal arcuate motion of the free end 88 of drive link 80 into linear motion relative to the movable housing component 34, generally perpendicular to the plunger 66. The relative linear motion of guide pin 90 can best be understood by comparing FIGS. 1 and 3.

In the disclosed embodiment, guide member 94 is a separate element, secured to movable housing component 34 by suitable fasteners, such as screws 98. The guide pin 90 is disposed within the enclosed guide member through opening 100, best shown in FIG. 3.

The driven or feed link 102 is pivotally connected to the movable housing component 34 by pivot pin 104. The driven end of drive link 102 includes a drive slot 106, best shown in FIGS. 3 and 4, and a transverse dwell face 108 which blends into the driven slot.

Figure 5:
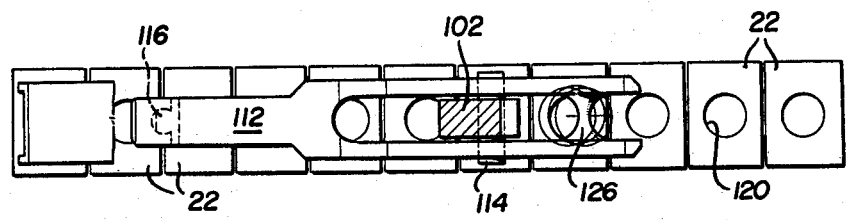
FIG. 5 is a top cross-sectional view of FIG. 1, in the direction of view arrows 5—5.

Pawl arm 112 pivotally connected between its end to the distal end of driven link 102, by pin 114. One end of the pawl arm includes a projecting finger 116, which is resiliently biased toward the fasteners 22 received within nut passage 62 by spring 118. The pawl finger 116 is receivable within the nut bores as shown in FIGS. 3 and 5. The pivotally connected end of the pawl arm is bifurcated, as shown in FIG. 5, to receive the distal end of the driven link. One end of the spring 118 is connected to the movable housing component by pin 124 and the opposed end of the spring is connected between the bifurcated ends of the pawl arm to connector portion 126, as shown in FIG. 5.

The operation of the feed mechanism 70 is best shown by comparing FIGS. 1 and 3. Downward motion of the ram or die element 40 engages the nose 54 of the fastener installation head against panel 42, which is supported by die 58. Movable housing component 34 is thus biased toward the stationary housing component 32, relatively closing the telescopic housing components. The relative motion causes drive link 80 to rotate counterclockwise, about pivot pin 82. As described, the resultant arcuate motion of guide pin 90 is translated into linear motion relative to the movable housing component 34 by guide slot 92 of guide member 94, resulting in a linear motion to the right of FIG. 1. The guide pin first engages the driven face 110 of drive slot 106, rotating driven link 102 in a clockwise direction about pivot pin 104, as shown in FIGS. 1 and 3. The rotational motion of driven link 102 thus causes pawl arm 112 to reciprocate within nut passage 62 toward plunger passage 64, to feed a nut beneath the plunger 66, as will be described more fully hereinbelow. Finally, guide pin 90 engages the dwell face 108 of the driven link 102, as shown in FIG. 3, retaining the driven link and the pawl arm in the dwell position, as shown in FIG. 3, during installation of the nut by the plunger 66. The dwell face 108 is now parallel to the guide slot 92, as shown in FIG. 3, such that no further motion is imparted to the driven link 102.

Upon installation of the nut disposed beneath the plunger, the motion of the feed mechanism is reversed. The ram or die member 40 is moved upwardly relative to FIG. 1, rotating the drive link 80 in a clockwise direction, until guide pin 90 is received within drive slot 106. The pin then engages the opposed side of drive slot 106, rotating driven link 102 in a counterclockwise direction relative to FIG. 3, reciprocating pawl arm 112 to the right. The pawl finger 116 includes a camming face 128 which engages the wall of the nut bore, lifting the camming finger out of the nut bore and the pawl arm 112 returns to the position shown in FIG. 1, ready for the next cycle of the fastener installation head of this embodiment of the invention.

As described, the stop lever 72 prevents entry of nuts 22 into the plunger passage 64, except upon downward actuation of the plunger 66. The stop lever 72 is pivotally connected to the movable housing component 34, adjacent the plunger 66, by pin 132. In the extended housing position shown in FIG. 1, the upper lever leg 134 is entrapped between a wall of the stationary housing component 32 and the plunger 66. The lower leg 136 extends at an angle into the plunger passage 64 to block entry of nuts 22 into the plunger passage. The plunger includes a camming face 138 extending parallel to the lower lever leg 136 located at the distal end of the plunger. A cut-out or slot 140 is provided in the plunger, spaced from the camming face 138, to receive the upper leg 134 of the lever, as described below. Further, a cut-out 142 is provided in the upper lever leg to permit free rotation of the upper lever leg 134, into the slot 140.

Upon actuation of the installation head, by downward movement of the ram or die 40, as described above, the camming surface 138 of the plunger will engage the lower leg 136 of lever 72, tending to rotate lever 72 about pivot pin 132. In the installation of nuts, a nut will first engage the lower lever leg 136, rotating the lever out of blocking engagement, upon actuation of the plunger 66 and the feed mechanism 70. As the plunger 66 reciprocates downwardly relative to movable housing component 34, as shown in FIG. 1, the upper leg portion 134 of the lever is received in slot 140, as shown in FIG. 3. Cut-out 142 permits free rotation of the lever about camming face 144. Finally, the lower leg 136 of the lever is received in a space defined by nose 54 and the plunger 66.

Extension of the housing components, by spring 48, engages the upper lever leg 134 against the camming face 144 of plunger slot 140, rotating lever 72 in a counterclockwise direction, finally returning the stop lever to the position shown in FIG. 1. The engagement of the upper lever leg 134 against the plunger, prevents a nut from entering the plunger passage 64, beyond the distal end of lower lever leg 136. This feature is particularly important in a fastener installation head of the type described having a positive feed mechanism 70, particularly where a fastener strip is utilized. When a new strip of fasteners is received in the nut chamber 62, the strip may be extended into the plunger passage 64, beneath the plunger 66, unless a positive stop means is provided. Where the strip is located in the plunger passage, prior to actuation of the feed means, downward actuation of the plunger will reciprocate the feed pawl 112 toward the plunger passage, as described, however the nut strip would then be blocked by the opposed plunger passage wall. In a position feed mechanism, the feed mechanism may then be damaged, requiring service of the fastener installation head.

The restrictor arm 74 extends generally parallel to the nut passage 62 and is pivotally connected to the movable housing component by pin 144. As shown, the leg 146 extends toward the plunger passage 64 at an angle relative to the opposed leg 148. The restrictor arm 74 is relatively thin and formed of a resilient metal. Laterally extending flanges 150 and 151 are biased against the movable housing component 34 to resiliently bias leg 146 toward the nut passage 62 and the restrictor finger 160 is resiliently biased through an opening in the bottom wall of nut passage 62. In the preferred embodiment of the nut restrictor, the finger 160 is shaped to be received within the nut bores 120. The restrictor arm extends to dispose the finger within the nut adjacent the plunger passage 64, to prevent a nut ready for installation from withdrawing into the nut passage 62, as will be described more fully hereinbelow. Where a nut strip is utilized the restrictor will thus prevent the strip from withdrawing into the nut chamber. The finger also includes a camming face 162 permitting nuts to be fed into the nut passage upon actuation of the feed mechanism. In the event that a nut strip must be withdrawn from the fastener installation head, such as during servicing, arm 74 may be resiliently biased toward the movable housing component 34, resiliently biasing the finger 160 out of restrictive engagement, permitting withdrawal of a nut strip.

Figure 2:
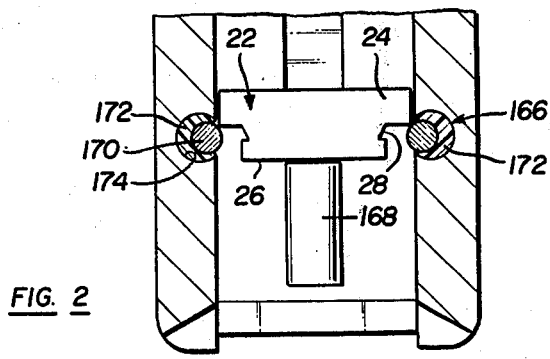
FIG. 2 is an end cross-sectional view of FIG. 1, in the direction of view arrows 2—2.

In the preferred embodiment, the nut is supported and guided within the nut passage 64 by guide rails 166 and vertical guide 168. The guide rails 166 are best shown in FIG. 2. In the disclosed embodiment, the guide rails include horizontal pins or rods 170, located generally in the plane of the fastener supporting wall of the nut passage 62. Resilient pads 172 resiliently bias the rods into the plunger passage, as shown in FIG. 2. The rods are received in generally circular grooves 174 defined in the opposed walls of the nose 54. The width of the opening of the grooves into the nut passage is less than the diameter of the rods and the semi-circular pads 172 resiliently bias the rods into the nut passage, to support a nut beneath the plunger, as shown in FIG. 2. The rods 170 are preferable formed of a relatively hard metal and the resilient pads 172 are preferable formed of a relatively tough resilient plastic. A suitable plastic for the pads is a relatively hard polyurethane, such as sold by J.P. Stephens & Co., inc. under the trade name "hi-tuff" 75 -D. A nut 22 is thus received on the rails 166 and supported by rods 170 beneath the plunger. Upon engagement by the plunger, the rods 170 are resilient biased into grooves 174, permitting passage of the nut through the nut passage 64, for installation as described below.

Vertical guide 168, guides the nut through the nut passage and prevents the nut from falling through the nut passage after passing the guide and support rails 166. In the disclosed embodiment, vertical guide 168 is cylindrical, extending parallel to the reciprocating axis of plunger 66. In the prior art embodiments of pierce and clinch nut installation heads, a series of ball bearings were disposed in the wall of the nose 54 which were resiliently biased into the plunger passage by springs. The ability of a resilient pad to replace the spring loaded balls, without permature wearing or failure, was unexpected, particularly in a pierce or clinch nut installation head feeding hard metal nuts under the impact of a plunger. The preferred material for the cylindrical pad is again a relatively tough, high impact polyurethane, such as the polyurethane described above.

In the preferred embodiment of the nut sensor, the mechanism 76 is located within the housing components to prevent damage or contamination and the sensor is adapted to sense and indicate a nut ready for installation by the head. As described above, his assures the feeding of all of the nuts disposed within the nut passage and assures that each actuation of the fastener installation head will result in the installation of a nut. This is particularly important where the fastener installation head is utilized in a panel forming die or the like, as described above. Further, in many applications, the die includes a number of fastener installation heads, securing nuts at said various locations in the panel. The sensor circuit of this embodiment may also be interconnected to the actuation circuit of the plunger 66 or the die, stopping the actuation circuit to assure installation of a nut upon each actuation of the plunger.

The disclosed embodiment of the nut sensor includes a switch 178 secured to a housing 180 and to the movable housing component 34 by suitable fasteners, such as screws 182. The switch includes a switch arm or reed 184 which engages the switch plunger 186 to close the switch circuit, as shown in FIG. 1. The nut sensor includes a sensor arm 188 pivotally connected to the switch housing 180 having a stop engaging the switch arm 184, as shown in FIG. 3. The sensor arm terminates in a channel-shaped end portion 192 adapted to engage a nut in the nut passage 62, adjacent the plunger passage 64 and ready for installation by the head.

When a nut is disposed adjacent the plunger passage 64, as shown in FIGS. 1 and 3, the channel-shaped end portion 192 of the sensor arm is rotated clockwise about the pivot axis to engage switch arm 184 and close the circuit of the sensor switch 178. When a nut is not ready for installation, the sensor arm 186 rotates counterclockwise, toward the nut support wall of the nut passage 62, permitting the switch plunger 186 to extend and open the circuit of the switch. As described, the switch circuit may be connected in series to the actuation circuit of the die or ram 40, stopping the actuation of the fastener installation head when a nut is not ready for installation. Alternatively, the switch may be connected to an indicator, actuating a light or an alarm when a nut is not ready for installation, notifying the operator that the fastener installation head requires nuts or servicing.

The operation of the fastener installation head 20 to install a nut in a panel is then as follows. The nuts 22 are received in the nut passage 62 to engage the arm 136 of stop 72. The fastener installation head is positioned as shown in FIG. 1 with the nose 54 engaging the panel 42 which is to receive a nut. Die 58 supports the panel for installation of the nut. The die member or ram 40 is biased toward the panel, as described above, relatively closing the housing components and actuating the feed mechanism 70. As described, the driven link 102 is thus rotated in a clockwise direction, reciprocating pawl arm 112 toward the plunger passage 64. As the pawl arm moves toward the plunger, the pawl finger 116 is received in the second nut spaced from the plunger passage 64. The finger is urged toward the nuts by spring 118. Continued movement of the pawl arm 112 disposes the nut adjacent the plunger passage beneath the plunger for installation. As described, stop arm 72 is rotated in a clockwise direction by the nuts entering the plunger passage, permitting a nut to enter the plunger passage. The nut is thus received upon guide rails 166, as shown in FIG. 2. The distal end of the plunger then engages the flanged end 24 of the nut, biasing the nut downwardly through the plunger passage 64 to engage the panel 42 and install the nut in the pierced panel opening, as shown in FIG. 3. As described in the above referenced pierce and clinch nut patents, the pilot portion 26 of the pierce nut pierces a slug 196 from the panel and the nut is received in the pierced opening, retaining the panel in the nut groove 28. The slug 196 falls through the opening 198 in the die 58. During final installation of the nut, the guide pin 90 of the driven link engages the dwell face 108 of the driven link 102; the dwell face then being parallel to the guide slot 92 in guide member 94. During installation, the distal end of the pawl arm is received within the channel-shaped end portion of the sensor arm.

Upon completion of the plunger cycle, spring 48 relatively opens the telescopic housing components, rotating stop lever 72 in a counter clockwise direction, to the position shown in FIG. 1, and reciprocating pawl arm 112 to the right in FIGS. 1 and 3. As described, the pawl finger 116 includes a camming surface which lifts the finger out of the nut bore and finally to the position shown in FIG. 1, normally resting upon the nut face of the second nut spaced from the plunger bore, ready for installation as shown in FIG. 1. Other details of the fastener installation head include a latch mechanism 202 which is adapted to release the pawl arm for servicing of the head. The latch mechanism includes a spring biased plunger 204 which is received in a cylindrical opening in the movable housing component 34. The plunger 204 may be extended to engage the end of the pawl arm 112, when the finger is received in a nut bore, thus rotating the pawl arm 112 in a clockwise direction and releasing the nut or nut strip. The housing components 32 and 34 may be disassembled by removing pin or bolt 44.

As described above, the length of the stroke of the reciprocating pawl arm is very important to the operation of the fastener installation head to assure accurate location of a nut beneath the plunger and to prevent a partial nut condition, wherein the plunger may fracture a nut partially received in the plunger passage.

Figure 9:
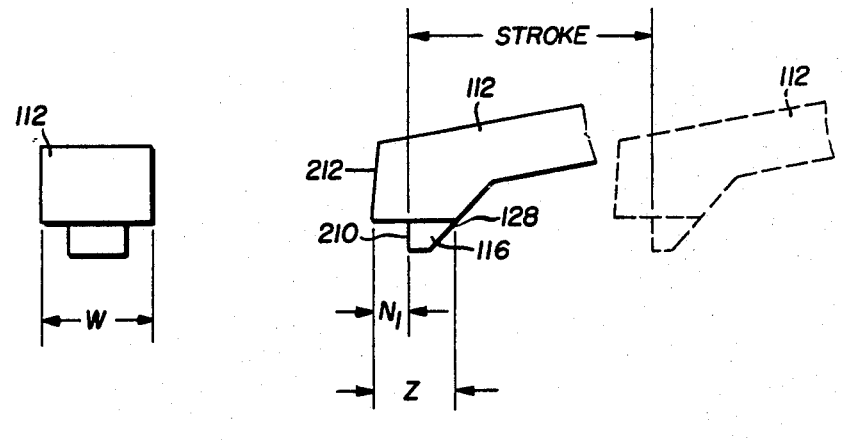
FIG. 9 is a schematic illustration of the feed pawl showing the stoke of the pawl and the dimentional relation.

As shown in FIG. 9, the pawl arm includes two possible feeding surfaces; the edge 210 of the pawl finger 116, which normally engages the bore of the nut; and the edge 212 which may feed a nut if a particularly large gap occurs between the nuts or the last nut in the passage. Feeding against surface 212 is also possible in a trip nut where the nuts may be spaced on the retainer.

Figure 10:
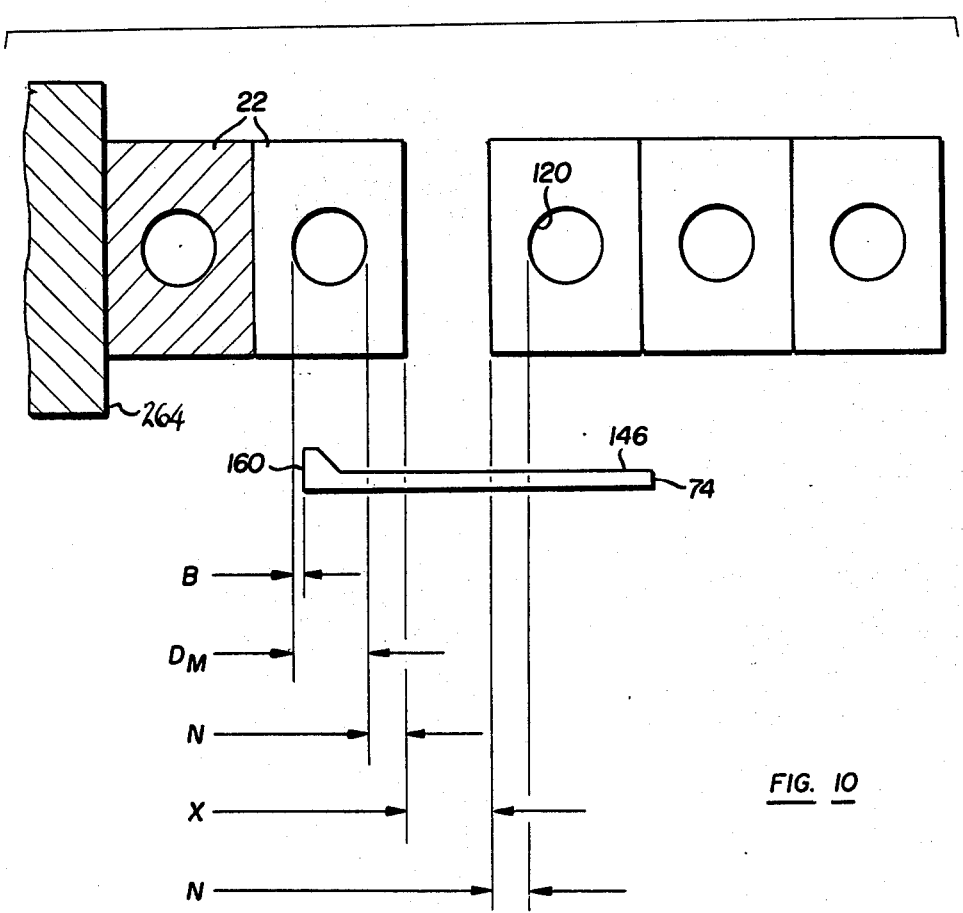
FIG. 10 is a schematic illustration similar to FIG. 9 showing the dimentional relation between the nuts which may be fed by the nut installation head and the nut restrictor.

It has been discovered that a relationship occurs between the stroke of the reciprocating pawl arm, as shown in FIG. 9 and the effective length of the feed pawl, the backlash of the system, as afforded by the restrictor arm, the nut bore, which is the minor diameter of the thread, and the edge length of the nut. This relationship is summed up in the following equation: Stroke $=X+B+D_M+2N$: Wherein, "X" is equal to the length of the gap between the nuts or in the strip which is to be fed without difficulty; "B" is the backlash contributed to primarily by the clearance between the threaded hole and the nut restrictor; $D_M$ is the minor diameter of the threaded hole; and 2N is equal to twice the edge length of the nut. The dimensional relation is shown in FIGS. 9 and 10.

Four additional conditions should also be met to satisfy the stroke equation and to provide proper orientation of the feed means. These conditions are as folows: (1) The stroke must be less than two nut widths, minus one edge length "N" of a nut. (2) The stroke must be greater than the gap "X" between the nuts, when feeding a strip. (3) The effective length of the pawl "Z" must be equal to or less than the length of the gap "X" in the strip that is to be fed without difficulty. (4) The effective length "Z" of the feed pawl must be greater than the minor diameter "$D_M$" of the thread or the width of the feed pawl "W" must be greater than the minor diameter "$D_M$" of the thread. If the effective length of the feed pawl "Z" were less than the minor diameter of the thread bore "$D_M$", the feeding surfaces of the pawl would engage in the threaded hole and would overfeed the strip by length "N" of the nut.

In a typical commercial pierce nut having a cut-off length of 0.50 inches and a minor diameter of the bore of 0.261 inches, the gap "X" which may be fed without difficulty is 0.281 inches, the backlash "B" is 0.044 inches, the minor diameter "$D_M$" of the threaded bore is 0.261 inches and the edge length of the nut "N" is equal to 0.117. Under these conditions, the stroke length is equal to 0.820, utilizing the stroke equation given above.

It is understood that the troke equation given above was developed primarily for the feeding of nuts in a strip, wherein the gap between the nuts is particularly important. The stroke equation is however equally adaptable to feeding nuts in bulk, except that the gap "X" will normally be 0.

Figure 6:
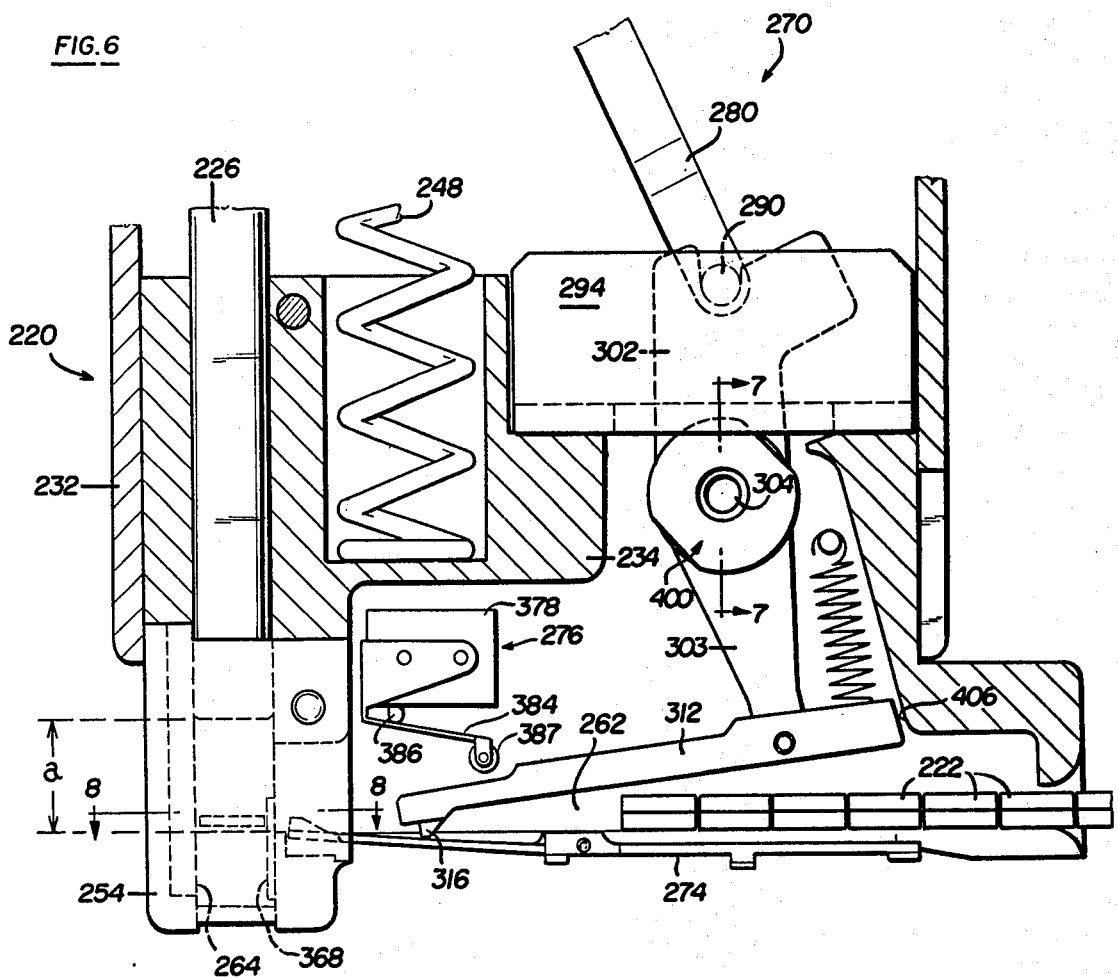
FIG. 6 is a side partially cross-sectional view of another embodiment of the fastener installation head of this invention.
Figure 7:
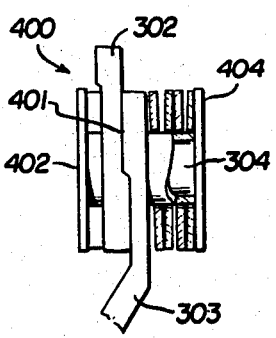
FIG. 7 is an end cross-sectional view of FIG. 6 in the direction of view arrows 7—7.

The embodiment of the fastener installation head shown in FIGS. 6 and 7 includes certain modifications of the embodment of the installation nut head shown in FIGS. 1 to 5. These modifications are primarily in the feed mechanism and the sensing means. As shown in FIGS. 6 and 7, the head 220 includes a stationary housing component 232, which may be substantially identical to the housing component 32 described above. The stationary housing component includes a plunger 216 which has been modified somewhat as described below. The relatively movable housing component 234 has been lengthened, increasing the length of the plunger stroke to contact with the nut, indicated at *a* in FIG. 6. As described, the spring 248 normally extends the housing components to position the plunger 266 above the intersection between the nut passage 262 and the plunger passage 264.

The feed mechanism in this embodiment similarly includes a drive link 280 pivotally connected to the stationary housing component 232, as described above, and the free end of the drive link has a guide pin 290 which is disposed within and guided by a guide member 294, translating the normal arcuate motion of the guide pin 290 into linear motion relative to the movable housing component 234. The driven link in this embodiment includes two components, 302 and 303, which are interconnected by a clutch assembly 400. It should be noted that the components of the fastener installation head shown in FIG. 6 are numbered in the same sequence as the elements of the fastener installation head embodiment of FIGS. 1 to 5. The clutch assembly is a new element in the combination. The driven link is pivotally connected to the movable housing component by pin 304, which extends through the clutch mechanism shown in FIG. 7.

The clutch mechanism includes a flanged outer hub 402 and a threadably received inner hub 404, retaining the assembly together. A plurality of Belleville-type thrust washers are disposed between the flanged end of the inner hub flange and the upper component 302 of the driven link. The thrust washers normally retain the components 302 and 303 of the driven link as one unit, such that the feed mechanism 270 normally operates substantially as described above. It should be noted however that the driven face of the upper component 302 of the drive link has been modified somewhat to accomodate the greater distance between the guide pin 290 and the pivotal connection 304. This has been caused by the increase in the piston stroke a, as described above.

In operation, the closing of the housing components 232 and 234, as described above, rotates the drive link 280 in a counterclockwise direction, rotating the driven link in a clockwise direction and extending the pawl arm 312 toward the plunger passage 264. The stop lever 72 in the embodiment disclosed in FIGS. 1 to 5 may be eliminated in this embodiment because the clutch eliminates the requirement for a stop lever. When the individual nuts or nut strip 222 is recieved in the fastener installation head, the nuts may in this embodiment be disposed directly into the plunger passage 264, locating the first nut beneath the plunger 266. Upon actuation of the feed mechanism 270, the pawl finger 316 is received within the second nut spaced from the plunger passage 264, as described above. The pawl arm 312 can not however advance toward the plunger passage 264, because a nut is already located in the plunger passage. In this situation, the upper portion 302 of the driven link rotates in a clockwise direction about pivot axis 304 and the lower portion 303 remains stationary. This is permitted by the clutch 400.

After installation of the nut in the plunger passage 264, the spring 248 extends the housing components, as described above, rotating driven link element 302 in a counterclockwise direction, biasing the end of pawl arm 312 against the housing at 406 and returning the feed mechanism to the ready position shown in FIG. 6. As shown in FIG. 7, the driven arm portions 302 and 303 include annular interlocking projecting portions having a camming face 401 which prevents relative rotation of driven link portion 302 in a counterclockwise direction relative to driven link portion 303. Upon engagement of the pawl arm 312, against housing portion 406, the link portions 302 and 303 are returned to the position shown in FIG. 7.

Figure 8:
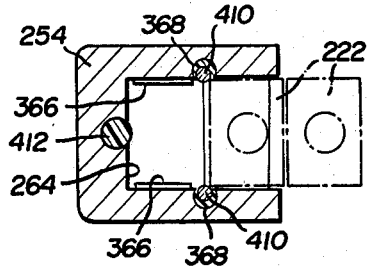
FIG. 8 is a top partially cross-sectioned view of FIG. 6, in the direction of view arrows 8—8.

The stop means shown in FIG. 8 may be utilized in the fastener installation head shown in FIG. 6 or may be replace the stop lever 72 shown in FIGS. 1 and 3. It is understood that the positive stop lever 72 shown in FIGS. 1 and 3 is preferred in a positive feed head because the nuts can not be fed utilizing the stop lever 72 until actuation of the plunger 66.

As shown in FIG. 8, the nose assembly 254 includes support rails 366 and vertical guide 368. The support rails 366 may be identical to the support rails 166 of the embodiment of the fastener installation head shown in FIGS. 1 to 5 and the vertical guide 368 is similar to the vertical guide 168 of the embodiment shown in FIGS. 1 to 5, except that the guide 368 extends past the intersection of the nut and plunger passages. The stop means in FIG. 8 includes two parallel posts 410 which are resiliently biased into the nut passage by resilient pads 412. As shown, the posts 410 extend perpendicular to the nut passage generally parallel to the reciprocating axis of the plunger 266. The posts are received in semi-circular grooves adjacent the intersection between the nut passage 262 and the plunger passage 264. The posts 410 are preferably hard metal posts and the pads 412 may be resilient polyurethane as described above in regard to the guide rails 166. As shown, the distance between the posts 410 is normally slightly less than the width of the nuts 22, blocking entry of the nuts into the plunger passage 264. Upon actuation of the feed mechanism 270 in FIG. 6, the nuts 22 will resiliently biases the posts 410 into the grooves defined in the nose 254, against the resilient pads 412, feeding a nut into the plunger passage 264. As described, the nut is received upon guide rails 366 for engagement by the plunger 266 and securement as described above.

This embodiment of the fastener installation head also includes a modified nut sensor 276. The nut sensor includes a switch 378 having a plunger which may be interconnected to the plunger actuation circuit or an indicator as described above. The switch lever or reed 384 in this embodiment includes a roller 387 which rides on the pawl arm 312, opposite the finger 316.

The fastener installation head shown in FIG. 6 does not include a nut adjacent the plunger passage and ready for installation. The pawl arm 312 therefore engages the nut supporting face of the nut passage 262 and the plunger 386 of the sensor switch 378 is therefore extended, opening the circuit of the switch. Upon receipt of a nut adjacent the plunger passage, pawl arm 312 is rotated in a clockwise direction, engaging the roller 387 and biasing the switch arm 384 toward the switch 378 and closing the switch. The roller will engage the thicker portion of the pawl arm 312 when the finger 316 is received in a nut bore and the pawl arm 312 is extended to dispose a nut in the plunger passage 264, maintaining the sensor circuit closed during feeding.

The sensor switch utilized in the embodiments shown in FIGS. 1 to 5 and FIGS. 6 and 7 may be any conventional normally open switch available commercially. Microswitches of the type shown in FIGS. 1 and 6 are available from the Micro-Switch Division of Honeywell, Inc., sold as part No. 1SE1. Other suitable microswitches are also available commercially.

The operation of the embodiment of the fastener installation head shown in FIG. 6 is therefore substantially the same as described in regard to FIGS. 1 and 3. The unnumbered elements of the fastener installation head of FIG. 6, may be identical to the components of the embodiments shown in FIG. 1.

It will be understood that various modifications may be made to the embodiments of the fastener installation head disclosed in this application. For example, the movable housing component 34 of FIGS. 1 and 3 may be lengthened as shown in FIG. 6 to increase the travel of the plunger 66 in the embodiment of the fastener installation head shown in FIGS. 1 to 5. The drive slot 106 and dwell face 108 of the driven link 102 of FIGS. 1 and 3 may also be modified to control the reciprocation of the pawl 112. The spring 248 may be modified as described above depending upon the requirements of the fastener installation head. For example, two or more springs may be utilized or a different extender means may be utilized. Further, various components of the disclosed embodiments of the fastener installation head may be interchanged, as required, for various applications of the head.

We claim:

1. In a fastener installation head having an elongated nut passage for receiving a plurality of nuts aligned in side to side relation for installation by said head, a transverse plunger passage having a reciprocating plunger therein communicating with said nut passage and receiving nuts beneath said plunger, for installation through said plunger passage upon actuation of said plunger, the improvement comprising:

a nut sensor means located within said nut passage having an electrical switch interconnected with the actuation circuit of said plunger and a probe means sensing the presence or absence of a nut adjacent said plunger passage, said probe means including an arm extending generally parallel to said nut passage with said arm normally engaging the nut adjacent said plunger passage and said arm closing said switch when a nut is located adjacent said plunger passage, ready for installation and said probe means opening the plunger actuation circuit and preventing actuation of said plunger when a nut is not located adjacent said plunger passage ready for installation.

2. In a nut installation head having an enclosed housing, an elongated nut passage receiving a plurality of nuts for installation by said head, a transverse plunger passage intersecting said nut passage and a plunger reciprocating within said plunger passage from above the intersection of said passages, through said intersection, to install nuts received from said nut passage, the improvement comprising:

a nut sensor means located within said housing in said nut passage, said sensor means including an electrical switch, a sensor arm extending generally parallel to said nut passage, said arm spaced from the supporting wall of said nut passage by a nut located within said nut passage adjacent said plunger passage and thereby ready for installation and said arm biased toward and closing said switch by a nut located ready for installation, said sensor means thereby adapted to indicate a nut ready for installation.

3. The nut installation head defined in claim 2, characterized in that said switch is connected to the actuation circuit of said plunger and said sensor means controlling said plunger to prevent actuation when a nut is not ready for installation.

4. The nut installation head defined in claim 2, characterized in that said arm is pivotally connected to said housing adjacent one end, the opposed end adapted to engage a nut adjacent said plunger passage ready for installation.

5. The nut installation head defined in claim 2, characterized in that said head includes a pawl means adapted to feed nuts from said nut passage to said plunger passage, said pawl means including a pawl arm reciprocating in said nut passage, engaging a nut spaced from said plunger passage, then said pawl means reciprocating said pawl arm toward said plunger passage to feed a nut beneath said plunger, said sensor arm having a channel-shaped portion opening toward and engaging the nuts received within said nut passage and said pawl arm reciprocating within said channel-shaped sensor arm portion to feed nuts within said plunger channel.

6. The nut installation head defined in claim 2, characterized in that said nut installation head includes a feed means adapted to feed nuts from said nut passage to said plunger passage, said feed means including a pawl arm pivotally connected to a feed link and reciprocating within said nut passage, one end of said pawl arm biased by said feed means toward the nuts received within said nut passage to engage a nut spaced from said plunger passage and said feed means reciprocating said pawl arm toward said plunger passage to feed a nut beneath said plunger, said sensor arm engaging said pawl arm one end and closing said sensor switch when said pawl arm is spaced from said nut passage by a nut received within said passage and opening the switch when said one pawl arm end engages the nut passage when a nut is not located ready for installation.

7. In a fastener installation head having a first passage receiving a plurality of fasteners for installation by said head, a second transverse passage intersecting said first passage and a plunger reciprocating within said second passage for installating fasteners received beneath said plunger from said first passage upon downward actuation of said plunger, the improvement comprising:

a feed means adapted to feed fasteners from said first passage to said second passage, beneath said plunger, said feed means including a pawl arm reciprocating within said first passage to engage a fastener spaced from said second passage and said pawl arm reciprocating toward said second passage to feed a fastener beneath said plunger and a sensor means adapted to sense the location of a fastener adjacent said second passage ready for installation, said sensor means including an electrical switch and a sensor switch arm pivotally connected to said head within said first passage, said sensor switch arm having a channel-shaped end portion opening toward and engaging a fastener located within said first passage adjacent said second passage, said sensor switch arm pivotally biased by said fastener toward said switch to close said switch and indicate the presence or absence of a fastener ready for installation, and said pawl arm reciprocating within said channel-shaped sensor switch arm end portion to feed fasteners beneath said plunger.

8. In a fastener installation head having a first passage receiving a plurality of fasteners for installation by said head, a second transverse passage intersecting said first passage and a plunger reciprocating within said second passage for installing fasteners received beneath said plunger from said first passage upon downward actuation of said plunger, the improvement comprising:

a feed means adapted to feed fasteners from said first passage to said second passage beneath said plunger, said feed means including a reciprocating feed link and a pawl arm pivotally connected to said feed link, said pawl arm reciprocating within said first passage, one end of said pawl arm extending from said pivotal connection to said feed link toward said second passage and resiliently biased toward the fastener supporting wall of said first passage, said pawl arm one end having an edge engaging a fastener spaced from said second passage and said feed means reciprocating said pawl arm toward said second passage to feed nuts beneath said plunger and a sensor means comprising an electrical switch and a switch arm, said switch arm located within said first passage and engaging the surface of said pawl arm opposed to said fastener engaging edge and said sensor arm normally biased towards said switch by said pawl arm when a fastener is located adjacent said second passage, said sensor means adapted to indicate the presence or absence of a fastener adjacent said second passage, ready for installation.

9. The fastener installation head defined in claim 8, characterized in that said sensor switch arm includes a roller normally engaging said pawl arm.

10. In a fastener installation head having an elongated nut passage receiving a plurality of nuts aligned in side to side relation for installation by said head, a transverse plunger passage having a reciprocating plunger therein communicating with said nut passage and receiving nuts beneath said plunger for installation through said plunger passage, upon actuation of said plunger, the improvement comprising:

a nut sensor means having an electrical switch and a nut probe located within said nut passage spaced from said plunger passage, said probe normally spaced from the nut supporting wall of said nut passage by a nut adjacent said plunger passage, the nut thereby ready for installation and said probe engaging a nut located in said ready position to close said switch, said sensor means thereby adapted to indicate a nut ready for installation.

\* \* \* \* \*